United States Patent [19]

Schülein et al.

[11] Patent Number: 4,989,104
[45] Date of Patent: Jan. 29, 1991

[54] APPARATUS FOR RECORDING AND QUICKLY RETRIEVING VIDEO SIGNAL PARTS ON A MAGNETIC TAPE

[75] Inventors: Reinhard Schülein, Oberasbach/Altenberg; Ernst Bratenstein, Fürth/Bay, both of Fed. Rep. of Germany

[73] Assignee: U.S. Philips Corporation, New York, N.Y.

[21] Appl. No.: 492,435

[22] Filed: Mar. 7, 1990

Related U.S. Application Data

[63] Continuation of Ser. No. 257,359, Oct. 12, 1988, abandoned, which is a continuation-in-part of Ser. No. 88,343, Aug. 21, 1987, abandoned.

[30] Foreign Application Priority Data

Aug. 23, 1986 [DE] Fed. Rep. of Germany ....... 3628743

[51] Int. Cl.⁵ ............................................. G11B 15/18
[52] U.S. Cl. .................................... 360/72.1; 360/69; 360/137
[58] Field of Search ................. 360/72.1, 79.4, 74.1, 360/71, 69, 137

[56] References Cited

U.S. PATENT DOCUMENTS

| | | | |
|---|---|---|---|
| 4,305,101 | 12/1981 | Yarbrough et al. | 360/69 |
| 4,338,644 | 7/1982 | Staar | 360/69 X |
| 4,499,509 | 2/1985 | Gohda et al. | 360/72.1 |
| 4,516,166 | 5/1985 | Tellone | 360/72.1 |
| 4,591,931 | 5/1986 | Baumeister | 360/72.1 |
| 4,644,425 | 2/1987 | Tamaki | 360/69 |
| 4,654,727 | 3/1987 | Blum et al. | 360/71 |

FOREIGN PATENT DOCUMENTS

| | | | |
|---|---|---|---|
| 0029946 | 6/1981 | European Pat. Off. | |
| 0169597 | 1/1986 | European Pat. Off. | |
| 2700801 | 7/1978 | Fed. Rep. of Germany | 360/137 |
| 2939912 | 4/1981 | Fed. Rep. of Germany | 360/72.1 |
| 55-52575 | 4/1980 | Japan | 360/137 |
| 59-116976 | 7/1984 | Japan | 360/72.1 |
| 59-116977 | 7/1984 | Japan | 360/72.1 |
| 60-98544 | 6/1985 | Japan | 360/72.1 |
| 7901801 | 9/1980 | Netherlands | 360/72.1 |

Primary Examiner—John H. Wolff
Attorney, Agent, or Firm—David R. Treacy

[57] ABSTRACT

In an apparatus for recording and quickly retrieving video signal parts on a magnetic tape, during recording information about the local position of each video signal part is automatically stored in a memory associated with the apparatus, which is designed for storing identifying information for a large number of magnetic tape cassettes. The retrieval of each video signal part on each of the cassettes can be effected substantially without delay in the quick rewind mode of operation.

12 Claims, 1 Drawing Sheet

APPARATUS FOR RECORDING AND QUICKLY RETRIEVING VIDEO SIGNAL PARTS ON A MAGNETIC TAPE

This is a continuation of application Ser. No. 07/257,359, filed Oct. 12, 1988, which is a continuation-in-part of Ser. No. 088,343, filed Aug. 21, 1987, both now abandoned.

BACKGROUND OF THE INVENTION

The invention relates to an apparatus for identifying and playing back selected portions of program material recorded on a magnetic tape cassette.

Several possibilities of quickly retrieving selected information or portions of audio or video programs recorded on a record carrier are already known to those skilled in the art. Most of these possibilities are based on providing standardized identification during recording, such as time markers, at given areas of the record carrier. By counting these time markers, a unique identifier is obtained, which can be used for quickly locating a given passage on the tape. The identifier can be filed as desired by the user by operating an element in a memory associated with the apparatus, which in a known tape memory device (cf. U.S. Pat. No. 3,988,778) is designed for storing the identifiers assigned to a single magnetic tape. If now a given part of the tape is to be reproduced, the associated identifier is obtained from the memory and the tape is taken to the desired area in the quick search mode of operation. In this quick search mode of operation, the tape must be in the threaded state because the time markers provided on the tape must be counted for determining the real location along the tape.

Further, it is already known from EP PS 29946 and from U.S. Pat. No. 4,224,644 to transfer the stored identifiers to a part of the tape free from recordings (for example the beginning or the end) before the tape cassette is taken from the memory of the magnetic recording and/or reproducing apparatus, and to reinsert the identifiers into the memory associated with the apparatus when the magnetic tape is reloaded.

EP-Appl. 169597 discloses a compact disc digital audio-player. In this known apparatus, a memory is provided in which besides location and time information about several sections or recorded musical programs, other information is stored which permits identifying the inserted disc. Identification and quick location of a desired section or musical program take place by comparison of the stored information with information contained as a subcode in the digital audio information.

It is further already known to draw up manually during recording a playing time contents list and to start during reproduction a desired signal part during playback, for example by means of a GOTO command in the quick rewind mode (with threaded-up tape).

SUMMARY OF THE INVENTION

The invention has for its object to improve the ease of use of a VCR or similar apparatus in such a manner that quick location of selected videosignal parts is rendered possible without manual draw-up of a playing time contents list being required, and also that when a cassette is exchanged, quick location of a selected passage or program is possible.

This object is achieved by utilizing a video cassette recorder having an operating keyboard, a comparator, a microprocessor, and a memory for storing information about the position of particular recorded passages or programs. The memory has sufficient capacity, and is arranged for storing information about the location of various passages and programs recorded on the tape in a plurality of cassettes. Whenever recording of a program or passage is initiated, information about the position of that passage or program on the tape is automatically stored in an area of the memory corresponding to the particular cassette inserted in the VCR. When a particular passage or program is to be selected for playback, the tape in the cassette is moved in a quick-wind mode to the beginning of the desired passage or program.

Preferably, the apparatus stores information identifying the position along the tape at which recording starts, and also the position in which recording is stopped.

Also, in a preferred embodiment, a user of the apparatus assigns identification of each particular cassette, and subsequently enters identification of a cassette being inserted for playback, by entering data via the keyboard. In a further preferred embodiment, in addition to automatic storage of at least the location of starting recording, a position identifier for selected scenes within any passage or program is entered manually via the keyboard. For this embodiment, it is particularly desirable that the contents of the memory be displayable as a list on a display screen, such as the screen of a television receiver used to display programs which are being played back.

The advantages of the invention reside more particularly in the fact that for location of the desired videosignal part a quick wind mode, such as quick rewind, can be used without need for making an accurate playing time list during recording. This is especially advantageous in the case of personal recording on domestic video recorders. Further, because of the storage of information specific for a particular playing time it is possible with a large number of magnetic tape cassettes (for example twenty, thirty or fifty) to reach a video signal part substantially without delay when a cassette is exchanged. Further advantageous properties of the apparatus of the apparatus according to the invention are apparent from the following description of an embodiment.

DESCRIPTION OF THE PREFERRED EMBODIMENTS

Figure 1:
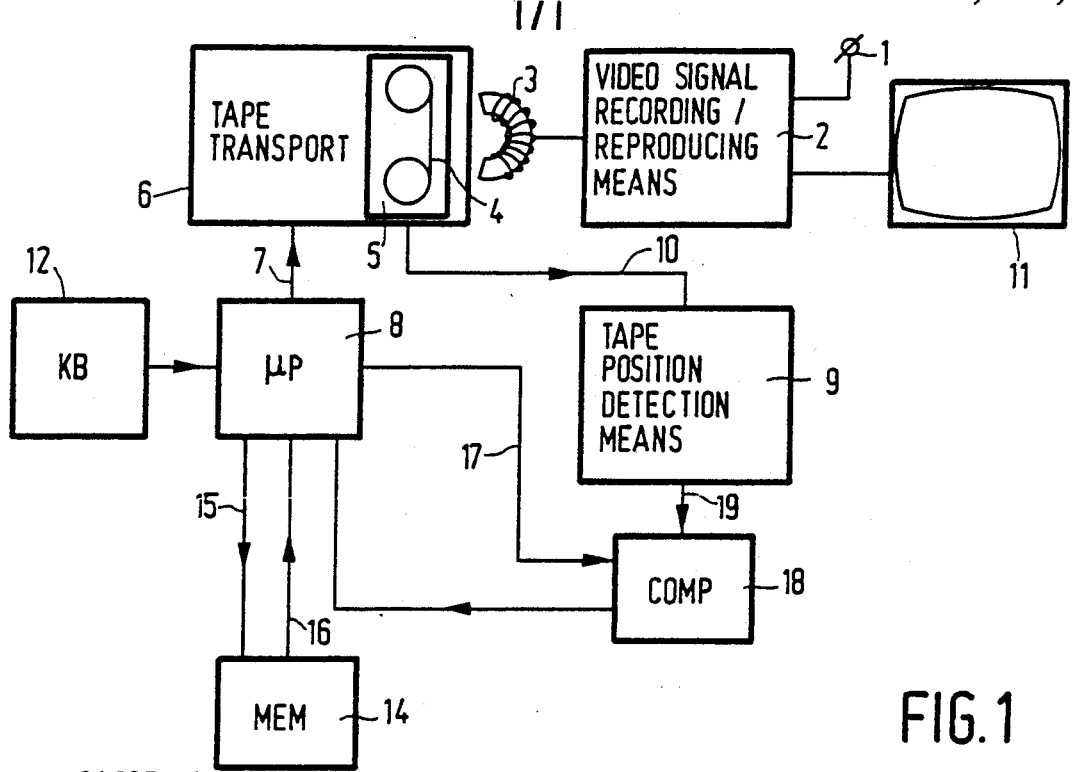
FIG. 1 shows an embodiment of the apparatus.

FIG. 1 shows an apparatus in the form of a videorecorder, comprising an input terminal 1 for receiving a video signal to be recorded. The input terminal 1 is coupled to a video signal adapter 2, generally known in the art, which adapts the video signal for recording by means of a read/write head 3 onto a magnetic tape 4 stored in a cassette 5. During reproduction the adapter 2 adapts the video signal read from the tape 4 by the read head 3 in such a way that it can be displayed on a display 11. A tape transport 6 transports the tape 4 during recording and reproduction. The tape transport 6 is controlled by a control signal issued by a microprocessor 8 and fed to the tape transport 6 via the line 7.

A tape position detector 9 is coupled to the tape transport means 6 via the line 10 for detecting, in a way known in the art, the position of the head 3 along the tape 4 during recording or reproduction.

The apparatus further comprises a keyboard 12 for inputting control operations, such as PLAY, RECORD, REWIND, etc., and programming commands, such as for VPS. The keyboard 12 is further adapted to supply cassette identification codes to the apparatus, as well as program, passage or frame or other part codes. For instance, the cassettes used can be numbered from 1, 2, 3, etc., up to the maximum number of cassettes available. The cassette identification code is, in that case, a number. The parts on each cassette can also be numbered. The part code is, in that case, also a number. The keyboard is coupled to the microprocessor 8 over a line 13 for supplying the keyboard instructions to the microprocessor 8. A memory 14 is also coupled to the processor 8. Address information is supplied to the memory 14 over line 15. The memory 14 supplies information along line 16 to the processor 8.

Figure 2:
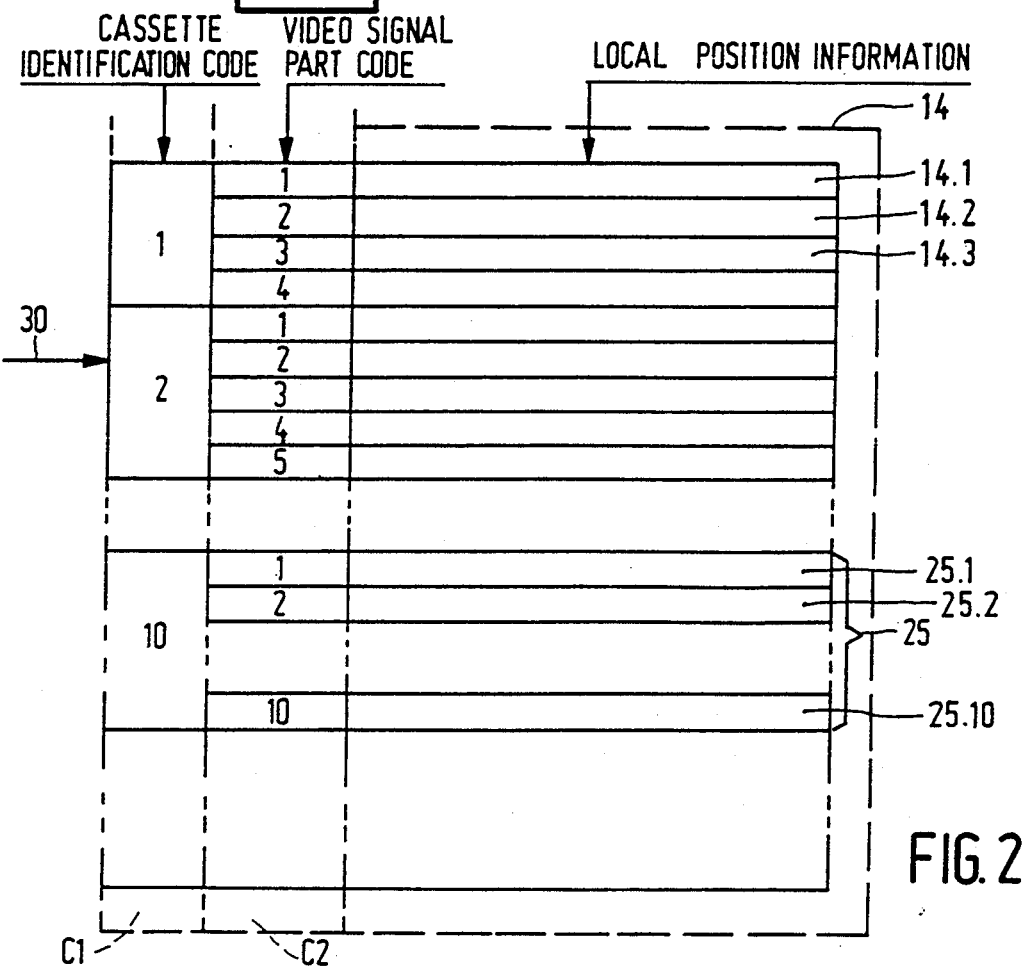
FIG. 2 further discloses the contents of the memory.

A format for arranging the contents of the memory 14 is shown in FIG. 2. The memory 14 contains a number of memory locations 14.1, 14.2, 14.3, etc. In each location information concerning a program or other part on a certain cassette can be stored. Such information can, for example, be a unique identifier such as the position of the starting point of the part. The columns on the left hand side of the memory in FIG. 2 indicate the addresses needed for addressing the memory locations. Each address is built up of a combination of a cassette identification code (column C1) and a video signal part code (column C2). The addresses are supplied to the memory via the line 15. The contents of the memory location addressed is supplied over the line 16 to the microprocessor 8. The local position information is supplied by the microprocessor 8 and line 17 to a comparator 18 which compares the local position information with the tape position information supplied by the tape position detector 9 over the line 19.

As a result of the comparison the comparator 18 supplies a signal over line 20 to the microprocessor 8 which, in turn, generates a control signal which is supplied over the line 7 to the tape transport 6.

Typical operation of the apparatus is as follows. On ten successive days, a given television broadcast (for example the news) is to be magnetically recorded by means of the video recorder each time at the same time of day. For this purpose, a magnetic tape cassette 5 previously provided with an identification code or identification number (for example "10") is inserted into the videorecorder. After the cassette has been inserted and after the person operating the VCR has inputted the number "10" by means of the decimal keyboard 12 of the video recorder, a given storage area of the memory 4 of the video recorder (for example storage area 25 corresponding to the cassette identification code 10, see FIG. 2) is assigned to the inserted magnetic tape cassette 5 by the processor 8. Subsequently, the recorder is programmed in known manner so that it is switched on and off on the ten aforementioned days at the desired times.

When the starting instant of the first broadcasting to be recorded is reached, the tape transport 6 sets the tape 4 into motion. The microprocessor assigns a sequence number or a serial number (for example "1") to this recording start instant. At the same time, the starting instant of the recording (=the playing time elapsed from the beginning of the tape at the beginning of the recording) is generated in a known manner and is automatically stored at the aforementioned storage area 25, for example, in memory location 25.1.

When the first broadcasting to be recorded has ended or when the recording stop instant of the first broadcasting to be recorded is reached, the tape transport 6 again stops the tape 4. At the same time, the recording stop instant of the first broadcasting to be recorded (=playing time elapsed from the beginning of the tape at the end of the recording) is generated essentially in known manner and is automatically stored at a further storage site within the aforementioned storage area 25, preferably also in memory location 25.1.

In the same manner, the recording start and recording stop times of the remaining nine broadcast to be recorded are automatically stored successively at the aforementioned storage area in memory locations 25.2 to 25.10, the microprocessor assigning a successive sequence number (2 to 10) to each recording start time.

After the magnetic tape cassette 5 identified as cassette 10 has been taken from the videorecorder, the information stored in the storage area 25 is maintained so that the user does not require — in contrast with known apparatus — a manually drawn-up playing time contents list accurate in time, but solely requires a summary of the recorded broadcasting or titles, as is usual nowadays with prerecorded audio cassettes commercially available. This summary of the recorded broadcastings or titles may be manually drawn up or may also be recovered during recording from data transmitted parallel to the actual broadcast and supplied by a printer (not shown) connected to the video recorder.

The quick retrieval of a given broadcasting recorded on the cassette 10 is effected in the following manner: the cassette 5 is inserted into the video recorder. The number "10" is inserted by means of the decimal key-board 12, as the cassette identification code and the associated storage area (storage area 25) of the memory is selected. Subsequently, the program or part code, which is the sequence number of the desired broadcast (for example "5") is supplied — also by means of the decimal key-board — and a take-over key (for example the reproduction key) is depressed. As a result, the memory 14 supplies the playing time data specific for the sequence number over the lines 16 and 17 to the comparator 18. Next, the tape 4 is wound in the quick rewind mode, i.e. in the non-threaded state, to the tape area corresponding to the beginning of the fifth recorded broadcast (or to a tape area at a short distance before it). The information supplied by the tape position detector 9 to the comparator 18 now equals the beginning of the fifth recorded broadcast. Subsequently, the apparatus is switched automatically to reproduction. Instead of switching over to reproduction, it is equally well possible that the apparatus switches to the search mode of operation, after the desired tape area has been reached. Likewise, the slow-motion mode can follow the search mode.

In the same manner, a cassette magazine consisting of a plurality of cassettes 5 can be inserted. A given storage area, such as 25 of the memory 14 in the video recorder, in which the data specific for the playing-time of the broadcasts recorded on the cassettes are stored, is assigned to each of the cassettes. Consequently, after each of these cassettes 5 of the cassette magazine has been inserted and the cassette number has been supplied, which advantageously corresponds to the number (cassette identification code) of the associated storage area, and after the sequence number (video signal part code) of the desired broadcasting has been supplied, the associated tape area can be reached without delay in the quick rewind mode.

The assignment of a given storage area to each inserted magnetic tape cassette must not necessarily be effected by means of the operating key-board 12. It is also possible that the magnetic tape cassette 5 is automatically identified with the aid of an arbitrary identification, which must be different from cassette to cassette, for example with the use of a bar code adhesive label.

It is further possible to occupy a storage area already occupied. This is of importance, for example, if a prerecorded cassette should be provided with new information or a new cassette should replace a cassette belonging to the cassette magazine.

In an advantageous further embodiment of the invention not only the recording start instants are stored automatically, but also further times are stored by means of a key of the operating key-board 12. In this manner, for example, the beginning times of individual songs of a music broadcasting may be stored and may be reached directly in the quick rewind mode.

Furthermore, instead of storing the recording start and stop times of a program or other part, also an identification specific for a part may be stored. A VPS identification offered by the transmitter may be used as such, for example, in broadcastings to be recorded. If on the contrary scenes sensed by means of a television camera are to be recorded, a suitable identification is a clear text supplied manually.

An advantageous further embodiment of the invention consists in that the contents of the memory is displayed as a contents list on a display screen, for example, the picture screen 11 of the connected television receiver. From this screen, for example by means of a cursor 30, see FIG. 2, a given part or a given scene may be selected and may be reached in the manner described above.

We claim:

1. An apparatus for recording, identifying and quickly retrieving programs or other video signal parts recorded on a magnetic tape, comprising:
   a video cassette recorder,
   an operating keyboard,
   a comparator,
   a memory for storing information about the respective locations of video signal parts on magnetic tape in a cassette, and
   a microprocessor and interconnecting means interconnecting said keyboard, comparator, microprocessor, and memory, operable during tape transport to compare information identifying a desired signal part entered through the keyboard with information corresponding to the instantaneous tape position,
   characterized in that said memory is arranged for storing information about the respective locations of a plurality of video signal parts on magnetic tapes contained in a plurality of magnetic tape cassettes,
   a given storage area of the memory is identified for storing information about a given one of said magnetic tape cassettes,
   during recording, said microprocessor operates as means for automatically storing information about the locations of video signal parts at the given storage area of the memory corresponding to a given cassette identification data entered through the keyboard, and
   for retrieving a desired video signal part, during transport in a quick wind mode information corresponding to the instantaneous tape position is compared in the comparator with information about the location of a video signal part corresponding to data identifying said part entered through said keyboard.

2. An apparatus as claimed in claim 1, characterized in that said microprocessor and interconnecting means automatically store data in the memory identifying the recording start time of the video signal part.

3. An apparatus as claimed in claim 1, characterized in that said microprocessor and interconnecting means automatically store data identifying the respective recording start and stop times of the video signal part.

4. An apparatus as claimed in claim 1, characterized in that the information about the location of each respective video signal part is a unique identifier for said video signal part.

5. An apparatus as claimed in claim 4, characterized in that said unique identifiers are generated automatically by said microprocessor and interconnecting means.

6. An apparatus as claimed in claim 4, characterized in that said microprocessor and interconnecting means are arranged for storing information identifying a given signal part, entered manually via said keyboard.

7. An apparatus as claimed in claim 1, characterized in that the storage area corresponding to a given cassette is identified by data entered via said keyboard.

8. An apparatus as claimed in claim 1, characterized in that said microprocessor is arranged automatically to assign sequence numbers associated with respective stored information corresponding to each of said locations.

9. An apparatus as claimed in claim 1, characterized in that said microprocessor, interconnecting means and memory are arranged to store information identifying the location of arbitrary scenes within a given video signal part, in response to manual data entry through said keyboard.

10. An apparatus as claimed in claim 9, comprising means for displaying contents of said memory as a list on a display screen.

11. An apparatus as claimed in claim 10, characterized in that a video signal part to be displayed is selected by an optical marker.

12. An apparatus as claimed in claim 1, comprising means for displaying contents of said memory as a list on a display screen.

* * * * *